United States Patent Office 3,438,294
Patented Apr. 15, 1969

3,438,294
METHOD FOR DIVISION OF BILLETS
Helmut Treppschuh, Geisweid, and Emil Baltes, Altenhundem, Germany, assignors to Stahlwerke Sudwestfalen Aktiengesellschaft, Geisweid, Germany
No Drawing. Filed Aug. 18, 1966, Ser. No. 573,172
Claims priority, application Germany, Aug. 25, 1965, St 24,313
Int. Cl. B26d 7/10
U.S. Cl. 83—15                    4 Claims

ABSTRACT OF THE DISCLOSURE

Improvement in subdividing steel billets by shearing such at between about 600 and 400° C., by cooling hot rolled steel billets to about 650 to 550° C. for about one-half to two hours and then shearing such billets at the first above set forth temperature.

---

This invention relates to the production of uniform-sized billets. It more particularly refers to a method for subdividing billets, particularly steel billets, into smaller pieces.

Bars, rods or other shapes of metal, particularly steel, must often be subdivided into smaller pieces or billets. This in generally accomplished by shearing, sawing or cutting as the case may be. In the case of steel billets, the cutting may be by means of a torch such as a plasma torch or an oxyacetylene torch or other similar devices.

Each of these subdivision methods have disadvantages and advantages attached thereto. For example, sewing and cutting have the advantage of substantially maintaining dimensional integrity of the subdivided billets but these have the disadvantages of higher cost and loss of material in the subdivision operation. Shearing has the advantage of lower cost and retention of substantially all material without loss but suffers from the disadvantages that all of the subdivided billets from a given starting billet may not be exactly the same size or shape. Since these billets, subdivided by shearing, often contain one or more burrs on the end thereof, and/or are deformed, it is often necessary to machine these ends after shearing in order to properly dimension them for further processing. In the case, where the subdivided billets are to be used in die-forging, problems are sometimes encountered where the billets have been subdivided by shearing because the end pieces are often smaller and lighter than those obtained from the middle of the billet.

It would be desirable to combine the attibutes and advantages of the known subdividing processes while minimizing the disadvantages thereof in the production of billets, particularly steel billets.

It is therefore an object of this invention, to provide an improved method of subdividing steel billets.

It is another object to provide an improved process for the subdivision of steel billets which is low in cost, keeps metal loss to a minimum and maintains dimensional uniformity in the subdivided product billet.

Other and additional objects of this invention will become apparent from a consideration of this entire specification including the claims appended hereto.

Subdivision of steel billets by shearing is usually performed at temperatures just below the rolling temperature of the steel. It has now been found that if the steel is subjected to a pretreatment at about 550° C. to 660° C., the subdivision is accomplished such that the resultant billets are much more uniform in size, weight and shape than has been possible by prior art shear subdivision techniques. Further, the burr and/or deformation zone which was characteristically present in shear subdivided billets produced according to the prior art is to a great extent or completely eliminated. The pretreatment is suitably carried out for a time of about ½ to 2 hours, preferably about 1 hour at the specified temperature. This pretreatment is such that the room temperature tensile strength of the billet is up to about 85 kg./mm.$^2$. The pretreatment is suitably carried out by holding the billet at the appropriate temperature for the indicated time or by heating or cooling the billet through the indicated temperature range over the indicated time interval.

Treatment in the temperature range of 550 and 650° C. has the advantage over treatment in higher or lower temperature ranges that the transformation takes place rapidly and that structural states are obtained which are particularly favorable for later working by the customer. However, it may be advantageous in the case of certain qualities of steel to treat the steel outside of the above-named temperature range between 550 and 650° C. if characteristics are thereby achieved which the customer particularly values.

The cutting temperature is expediently selected on the basis of the composition of the steel to be cut, for one must try to perform the cut at as high a temperature as possible on account of the hot strength, but one may not cut in a temperature range so high as would result in any intolerable deformation of the billet. It has proven expedient to cut steels with high carbon contents at the upper limit of the above-stated temperature range.

EXAMPLE

A structural steel containing .44% C, 1% Cr and .2% Mo was cast into ingots of 1.3 metric tons. These ingots were rolled out into billets of 80 mm. square on a rolling mill having rolls of 800 mm. diameter. After rolling the temperature of the billets was about 890° C. The billets were subdivided into lengths of 3500 mm. by means of a shear having a throat depth of 220 mm. The billets were deformed adjacent the cutting plane. The longitudinal edges were pressed out laterally and the cross-section of the cutting plane was changed into a trapezoid 86 mm. high and 75 and 98 mm. long. After cooling in air the steel had a tensile strength of 97 kg./mm.$^2$. The same steel was treated according to this invention. After rolling the billet, having a temperature of about 650° C., was put undivided into a furnace and the billet was held there about 15 minutes at a temperature between 650 and 550° C. After this the steel was transported to a cold-hot shear and subdivided into lengths of 3500 mm. After cooling to room temperature it had a tensile strength of 78 kg./mm.$^2$. The edges of the billet only differ 2 to 3 mm. from the straight line and the cutting plane had the form of a rhombus with edge lengths of 88 x 88 mm.

What is claimed is:
1. A method of subdividing hot rolled steel billets, which billets upon direct cooling from their hot rolled temperature have a room a temperature tensile strength of above 85 kg./mm.$^2$, which comprises cooling said hot rolled billets to about 650 to 550° C.; holding said billets at said temperature for about ½ to 2 hours, whereby changing the room temperature tensile strength of said billet to a value of less than about 85 kg./mm.$^2$; cooling said billet to about 600 to 400° C., and shearing said billet at this last set forth temperature.

2. Method as claimed in claim 1, wherein said treatment is carried out for about 1 hour.

3. Method as claimed in claim 1, wherein said treatment is carried out isothermally.

4. Method as claimed in claim 1, wherein said force is applied at a temperature proportional to the carbon content of said steel.

References Cited

UNITED STATES PATENTS 1,636,955  7/1927  Golding.
1,934,067  11/1933  Livingston _____ 83—15 X

FOREIGN PATENTS 944,143  12/1963  Great Britain.

JAMES M. MEISTER, *Primary Examiner.*